Jan. 27, 1942.   N. J. SMITH   2,270,975
CHART HOLDING DEVICE
Filed March 25, 1939
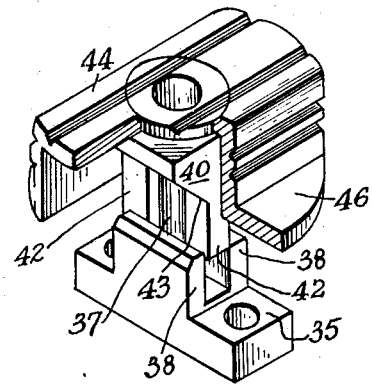
Fig. 1
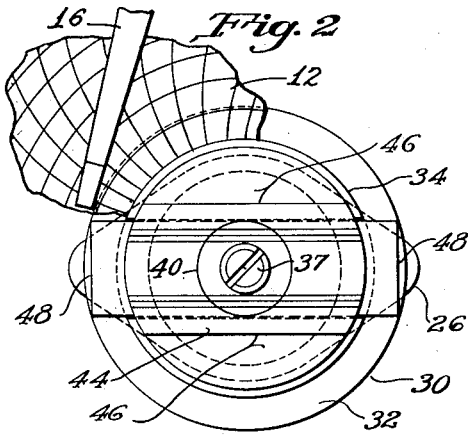
Fig. 2
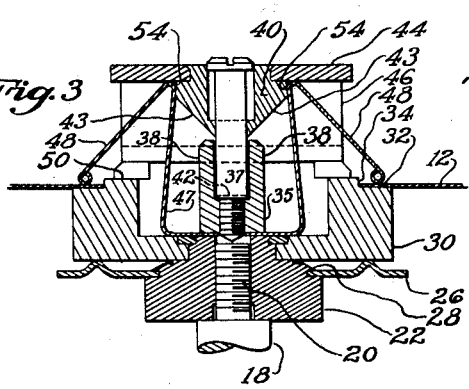
Fig. 3
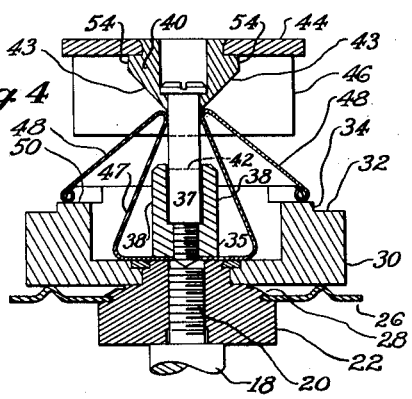
Fig. 4
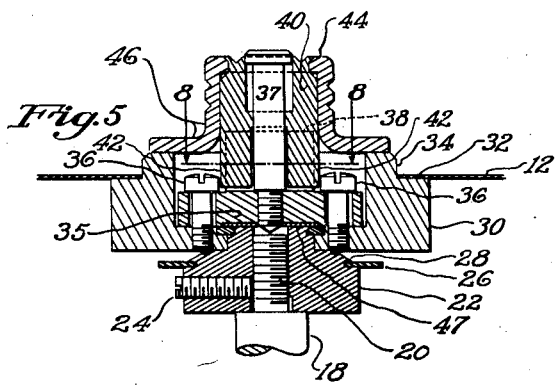
Fig. 5
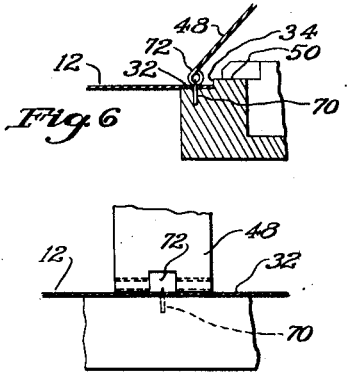
Fig. 6
Fig. 7
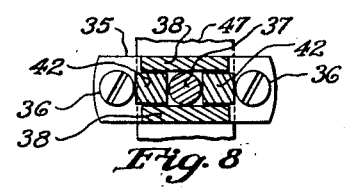
Fig. 8
Inventor
Norman J. Smith
by his attorneys
Fish Hildreth Cary & Jenney Patented Jan. 27, 1942

2,270,975

UNITED STATES PATENT OFFICE 2,270,975

CHART HOLDING DEVICE

Norman J. Smith, Medfield, Mass., assignor to Crosby Steam Gage & Valve Company, Boston, Mass., a corporation of Massachusetts Application March 25, 1939, Serial No. 264,173

1 Claim. (Cl. 234—75)

The present invention relates to improved holding means for detachably securing a recording chart or the like to the usual clock-actuated revolving shaft.

The purpose and object of the invention is to provide a simple and effective mechanism for securing a chart or the like in place while facilitating substitution of one chart for another.

With this and other objects in view, the various features of the invention consist in certain novel features of construction, combinations and arrangements of parts hereinafter described and claimed, the advantages of which will be obvious to those skilled in the art from the following description.

In the accompanying drawing illustrating the preferred form of the invention, Fig. 1 represents a perspective view partially in section of the operating portion of the chart clamp with the housing partially cut away and the clamping fingers not shown; Fig. 2 is a plan view of the improved form of chart clamp; Figs. 3 and 4 illustrate vertical sections of the chart clamp in closed and open position respectively; Fig. 5 is a section of the clamp similar to Fig. 3, but taken at right angles thereto; Figs. 6 and 7 are details illustrating means for positively holding the chart; and Fig. 8 is a detail illustrating a section of the clamp on the line 8—8 of Fig. 5.

Referring to the illustrated embodiment of the invention, a conventional recorder case is provided, with the usual removable chart 12 held in place by the chart clamp in such a manner that the recording pen 16 is caused to move thereover. Referring more particularly to Figs. 2 to 4, it will be observed that the revolving clock shaft 18 of the instrument is provided with a reduced threaded upper end 20, upon which is threadedly mounted a hub 22 locked to the shaft by a set screw 24, and having a spring plate 26 secured to the hub as indicated at 28, and frictionally engaging with a chart-supporting ring 30, which is revolvably supported upon the hub 22 but normally caused to turn therewith by the frictional engagement of the plate 26 bearing against the under side. The upper portion of the chart support 30 is provided with a circular or circumferential seat to form a chart-supporting surface 32 bounded at its inner margin by a locating shoulder 34, the paper chart, as will be evident, having an opening corresponding in size with that of the shoulder and located thereby, and the step or shoulder 34 being of such a depth that the chart normally lies therebelow and may be clamped to the surface 32 by the spreading of spring arms 48 without tearing or displacement.

The ring 30 has connected thereto a head 35 connected through bolts 36, and is provided with an upstanding guide stud 37 threaded into the head at the lower end. The head 35 is also provided, as indicated more particularly in Fig. 5, with oppositely disposed wings 38, which serve as additional guide members for engagement with a portion of the movable camming device 40, which as indicated more particularly in Fig. 8, is provided with downwardly projecting legs 42 at opposite sides of the guide stud and extending between the wings 38. The camming device 40 is provided with wedge surfaces 43, as indicated in Figs. 3 and 4, and is enclosed within a generally rectangular housing 44, having depending side walls 46. With this construction it will be noted that in either position of the camming device, as illustrated in Figs. 3 and 4, respectively, the wings 38 and legs 42 are always in sliding contact and invariably are in a position to cause the camming device to turn with the ring 30 through the connected parts, thus permitting adjustment of the ring and connected chart by turning movement of the camming device 40 and housing 44.

The chart is secured in place on the chart ring by means of spring fingers or arms 48 formed as outwardly bent extensions of the upper portions of a generally U-shaped spring 47 having its base portion secured beneath the revolving head 35. Normally, that is, when the camming device 40 is raised (Fig. 4), the spring arms 48 spring inwardly so that they are contained within an area smaller than the opening in the chart. When the arms 48 spring inwardly, their ends retract into slots 50 formed in the circular positioning shoulder 34. These slots are formed to provide seats for the spring ends slightly above the level of the paper chart 12 but below the general level of said shoulder 34, which is indicated in Figure 5. Upon depressing the camming device 40, the wedging surfaces 54 force the upper portions of spring 47 outwardly, causing the ends of spring arms 48 to move off the seats and onto the chart, as shown in Figure 3. The wedge surfaces terminate short of the upper end of the camming device, causing the contacting portions of the bent spring to bear against flat parallel surfaces 54 and thereby retain the spring in outwardly extended operating position with the camming device depressed. As will be evident, the depending portions 46 of the housing 44 embrace the spring at opposite sides and prevent independent turning movement of the spring with respect thereto.

With this construction the chart when in clamped position together with its supporting ring 30 normally moves as a unit with the clock shaft and the hub 22, and may be connected and released by manual movement of the actuating member toward and from the chart surface. The chart and its connected parts may, however, be adjusted angularly by revolving the housing 44 which carries with it the supporting ring 30 and the hold-down spring 47, this manual turning movement breaking the normal driving connection between the hub 22 which remains locked to the shaft, and the supporting ring 30 which is frictionally connected therewith.

Normally the pressure of the spring arms on the paper chart is sufficient to cause it to turn with the clock shaft. In those cases, however, where it may be desirable to provide additional driving means, it has been found satisfactory, as indicated in Figs. 6 and 7, to provide a supporting surface 32 with one or two upstanding pins 70 projecting from the supporting surface in the region where the paper chart is engaged by the ends of the spring arms 48, these ends being provided with longitudinal slots 72 to embrace the projecting ends of the pins and force the paper chart in flatwise relation to the supporting surface 32 in the region of the pin.

What is claimed is:

A holder for recorder charts, comprising a chart ring provided with a chart-seating surface and a centrally disposed chart-positioning shoulder, a generally U-shaped spring member carried by the chart ring and having spring arms extending outwardly from the upper portions thereof, the spring arms being normally contained within the area of the positioning shoulder, and an axially slidable camming device having wedge surfaces adapted, upon axial movement of the device, to engage and spread the upper portions of the spring member, thereby to cause the spring arms to move outwardly beyond the central positioning shoulder into chart-clamping position, said wedge surfaces terminating in surfaces shaped to cooperate with the upper portions of the spring member to retain the device with the spring arms in chart clamping position.

NORMAN J. SMITH.